(12) United States Patent
Ohara et al.

(10) Patent No.: US 7,471,428 B2
(45) Date of Patent: Dec. 30, 2008

(54) CONTACT IMAGE SENSOR MODULE AND IMAGE READING DEVICE EQUIPPED WITH THE SAME

(75) Inventors: Toshimitsu Ohara, Nagano (JP); Kazuhiro Nakano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 669 days.

(21) Appl. No.: 11/080,068

(22) Filed: Mar. 14, 2005

(65) Prior Publication Data
US 2005/0213170 A1    Sep. 29, 2005

(30) Foreign Application Priority Data

Mar. 12, 2004    (JP) .......................... P 2004-070877
Mar. 12, 2004    (JP) .......................... P 2004-070897

(51) Int. Cl.
*H04N 1/04*    (2006.01)
*H04N 1/46*    (2006.01)

(52) U.S. Cl. .................. 358/497; 358/474; 358/487; 358/475; 358/505; 358/506; 358/509

(58) Field of Classification Search ............... 358/474, 358/497, 496, 483, 482, 505, 487, 475, 506, 358/509; 250/208.1, 234–236, 216, 239; 382/312, 318, 319; 355/55, 40, 41
See application file for complete search history.

(56) References Cited

U.S. PATENT DOCUMENTS

| | | | |
|---|---|---|---|
| 6,188,465 B1 * | 2/2001 | Rees et al. | 355/55 |
| 6,643,038 B1 | 11/2003 | Kawahara et al. | |
| 6,961,157 B2 | 11/2005 | Tandon et al. | |
| 7,339,150 B2 * | 3/2008 | Ohara | 250/208.1 |
| 2002/0048055 A1 | 4/2002 | Yushiya | |
| 2005/0219658 A1 * | 10/2005 | Miyahara | 358/509 |
| 2006/0023266 A1 * | 2/2006 | Ohara | 358/474 |
| 2006/0044625 A1 * | 3/2006 | Ohara | 358/474 |
| 2006/0077475 A1 | 4/2006 | Ta Su | |
| 2006/0158696 A1 * | 7/2006 | Amimoto | 358/474 |

FOREIGN PATENT DOCUMENTS

| | | |
|---|---|---|
| JP | 2001-133906 | 5/2001 |
| JP | 2003-037712 | 2/2003 |
| JP | 2003-037713 | 2/2003 |

* cited by examiner

*Primary Examiner*—Cheukfan Lee
(74) *Attorney, Agent, or Firm*—Edwards Angell Palmer & Dodge LLP; John J. Penny, Jr.

(57) ABSTRACT

A contact image sensor module includes: a first image sensor, having a first light receiving element set aligned in a straight line; a second image sensor, having a second light receiving element set aligned in parallel to the abovementioned first light receiving element set; a first lens unit, forming, on the abovementioned first light receiving element set, a clear image of a first object, which is positioned at a first distance from light receiving surfaces of the abovementioned first light receiving element set; and a second lens unit, forming, on the abovementioned second light receiving element set, a clear image of a second object, which is positioned at a second distance, differing from the above mentioned first distance, from the light receiving surfaces of the abovementioned first light receiving element set.

7 Claims, 9 Drawing Sheets

CONTACT IMAGE SENSOR MODULE AND IMAGE READING DEVICE EQUIPPED WITH THE SAME

BACKGROUND OF THE INVENTION

The present invention relates to a contact image sensor module and an image reading device equipped with the same.

Image reading devices equipped with a contact image sensor module (see Patent Document 1) have been generally known. Since a contact image sensor module is short in the optical path of the optical system, an image reading device can be made compact readily.

However, since a contact image sensor module is shallow in the depth of field, an original that is positioned at a position away from a platen surface of an original platen cannot be read clearly. For example, the image reading device described in Patent Document 1 cannot read a 35 mm film, held in a holder, etc., clearly.

The image reading devices described in Patent Documents 2 and 3 are equipped with a plurality of optical systems and can clearly read reflection originals and transmission originals by the switching of the optical path in accordance with the original. However, the image reading devices described Patent Documents 2 and 3 are complex in the arrangement of the optical system, long in optical path, and thus high in manufacturing cost and not suited for compact size.

Further, a contact image sensor module is equipped with an image sensor of a length that is in accordance with a maximum reading width for an original. Thus with an image reading device with a maximum reading width, for example, of A4 size width, even for increasing the reading resolution for a 35 mm film, the resolution of the image sensor of the A4 size width must be increased. In general, the higher the resolution of an image sensor, the greater the noise generated in the image sensor. Thus with the image reading device described in Patent Document 1, if the resolution of the image sensor is to be increased in accordance with an original that is small in original size but high in the recording density of image information, as in a 35 mm film, the image quality of the read image of an original of comparatively low recording density of image information, as in a printed document, drops for all original sizes.

A contact image sensor module is equipped with an LED that emits light of a red color, an LED that emits light of a green color, and an LED that emits light of a blue color, and performs reading of a color image by lighting up these LED's in a time-divided manner. The image reading device described in Patent Document 1 is thus slow in reading speed.

The image reading devices described in Patent Documents 2 and 3 are equipped with a plurality of optical systems and enable an original to be read at a desired resolution by the switching of the optical path in accordance with the original. However, the image reading devices described Patent Documents 2 and 3 are complex in the arrangement of the optical system, long in optical path, and thus high in manufacturing cost and not suited for compact size.

Patent Document 1: Japanese Unexamined Patent Publication No. 2001-133906
Patent Document 2: Japanese Unexamined Patent Publication No. 2003-37712
Patent Document 3: Japanese Unexamined Patent Publication No. 2003-37713

SUMMARY OF THE INVENTION

The present invention has been made in view of the above problems. A first object of the invention is to provide a contact image sensor module that can clearly read both originals positioned on a platen surface of an original platen of an image reading device and originals positioned away from the platen surface. A second object of the invention is to provide an image reading device equipped with contact image sensor module that can clearly read both originals positioned on a platen surface of an original platen of the image reading device and originals positioned away from the platen surface. A third object of the invention is to provide an image reading device equipped with contact image sensor module, which is high in reading speed and can read images of high image quality.

In order to solve the aforesaid object, the invention is characterized by having the following arrangement.

(1) A contact image sensor module comprising:
a first image sensor that includes a first light receiving element set aligned in a straight line;
a second image sensor that a second light receiving element set aligned in parallel to the first light receiving element set;
a first lens unit that forms, on the first light receiving element set, a clear image of a first object positioned at a first distance from a light receiving surface of the first-light receiving element set; and
a second lens unit that forms, on the second light receiving element set, a clear image of a second object positioned at a second distance, differing from the first distance, from the light receiving surface of the first light receiving element set.

(2) The contact image sensor module according to (1), wherein focal length of the first lens unit is equal to focal length of the second lens unit.

(3) The contact image sensor module according to (1), wherein focal length of the first lens unit differs from focal length of the second lens unit and the light receiving surface of the first light receiving element set and the light receiving surface of the second light receiving element set are disposed on a same plane.

(4) The contact image sensor module according to (1), wherein the resolution of the first image sensor differs from the resolution of the second image sensor.

(5). The contact image sensor module according to (4), wherein a longitudinal direction width of an alignment range of the first light receiving element set differs from a longitudinal direction width of an alignment range of the second light receiving element set.

(6) An image reading device comprising the contact image sensor module according to any of (1) through (5).

(7) The image reading device according to (6), further comprising:
an original platen on which the first object and the second object are to be set;
a first light source unit that radiates light of a plurality of colors in a time-divided manner to illuminate the first object; and
a second light source unit that radiates white light to illuminate the second object; and
wherein the first image sensor includes the first light receiving element set arranged in one channel,
wherein the second image sensor includes the second light receiving element set arranged in three channels, and
wherein the contact image sensor module includes color filters that perform color separation of the white light illuminated from the second light source unit and make the color-separated light incident on the respective channels of the second light receiving element set.

(8) An image reading device comprising:
a first light source unit that radiates light of a plurality of colors in a time-divided manner to illuminate a first object;
a second light source unit that radiates white light to illuminate a second object; and
a contact image sensor module including
a first image sensor that includes a first light receiving element set arranged in one channel and aligned in a straight line,
a second image sensor that includes a second light receiving element set that is arranged in three channels, aligned in parallel to the first light receiving element set, and differs in resolution from the first image sensor,
a first lens unit that forms an image of the first object on the first light receiving element set,
a second lens unit that forms an image of the second object on the second light receiving element set, and
color filters that performs color separation of the white light illuminated from the second light source unit and make the color-separated light incident on the respective channels of the second light receiving element set.

(9) The image reading device according to (1), wherein the longitudinal direction width of the alignment range of the first light receiving element set differs from the longitudinal direction width of the alignment range of the second light receiving element set.

DETAILED DESCRIPTION OF PREFERRED EMBODIMENTS

Embodiments according to the present invention will now be described with reference to the drawings.

First Embodiment

Figure 2:
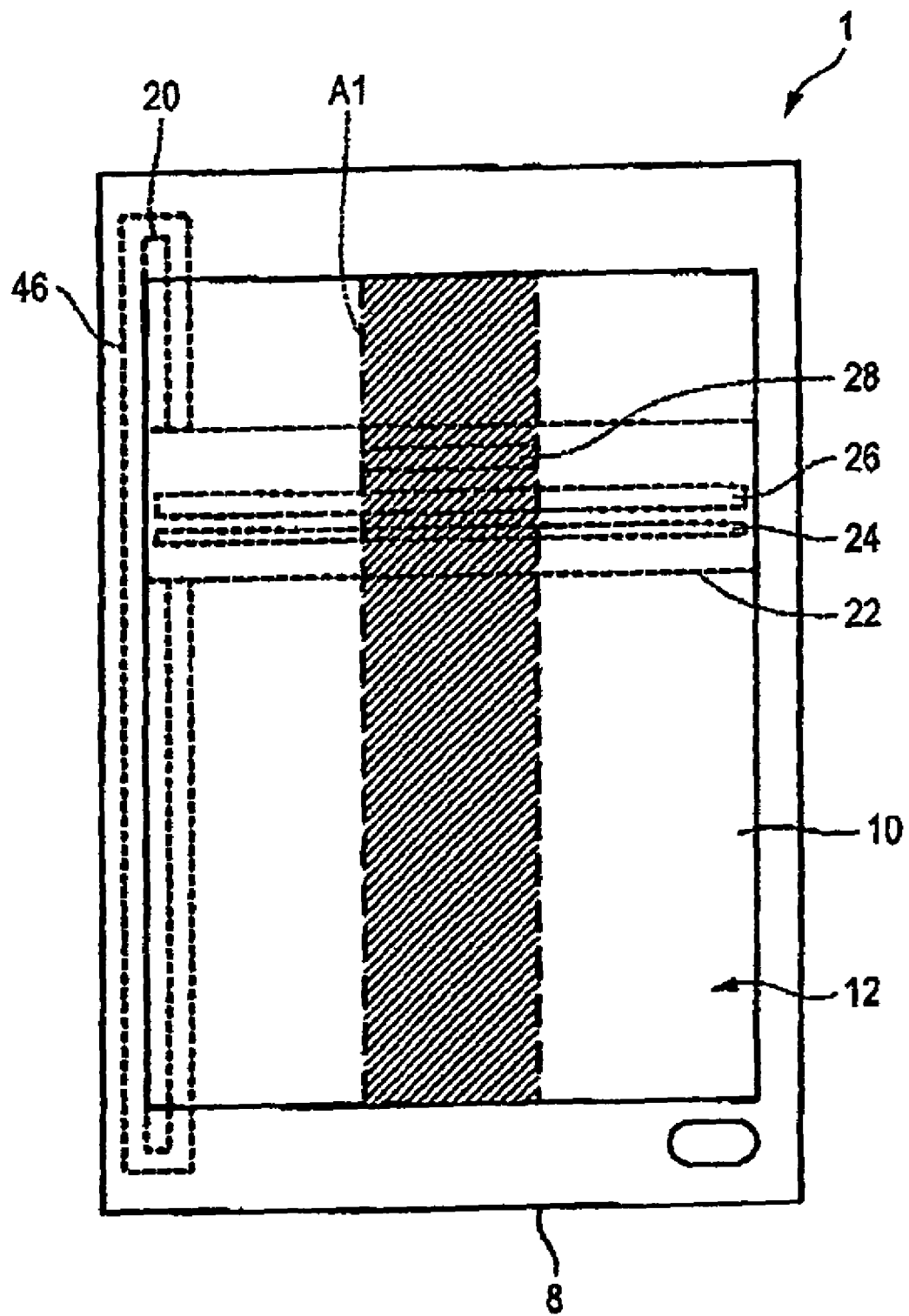
FIG. 2 is a schematic view showing an image reading device of the first embodiment of the invention.
Figure 3:
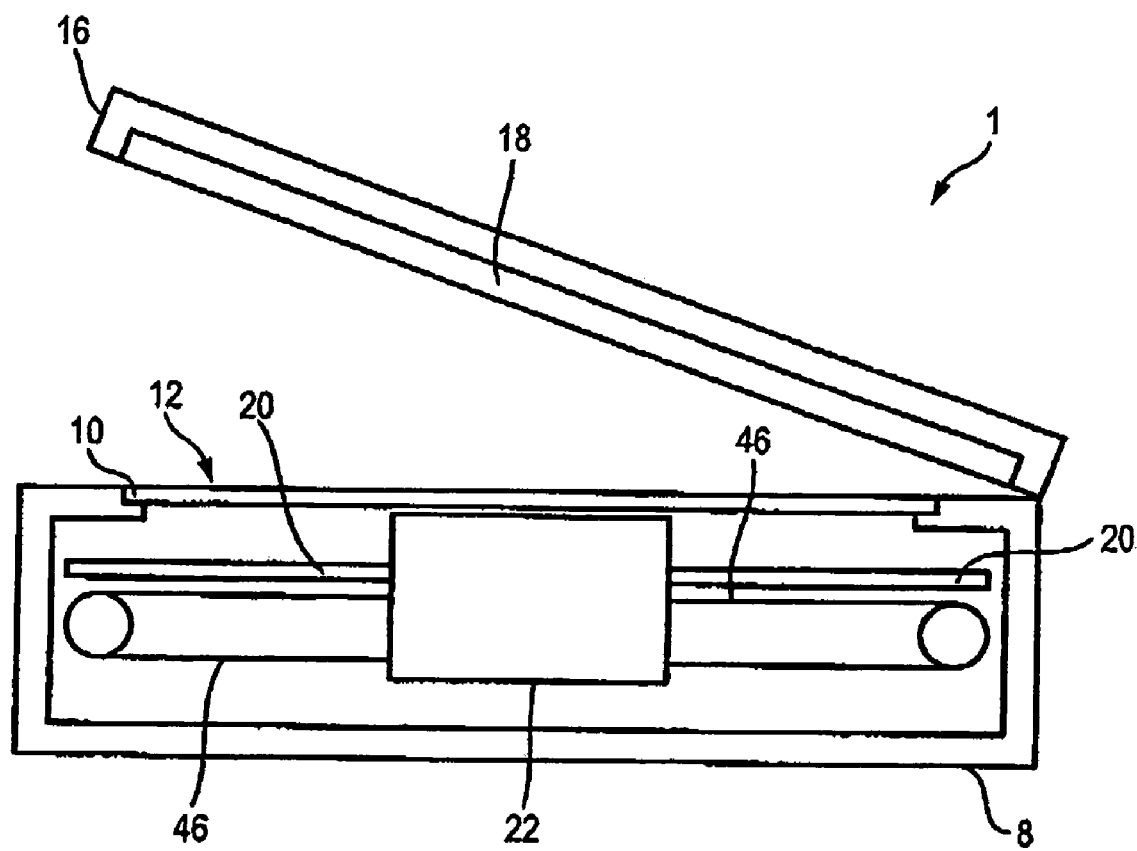
FIG. 3 is a schematic view showing the image reading device of the first embodiment of the invention.
Figure 4:
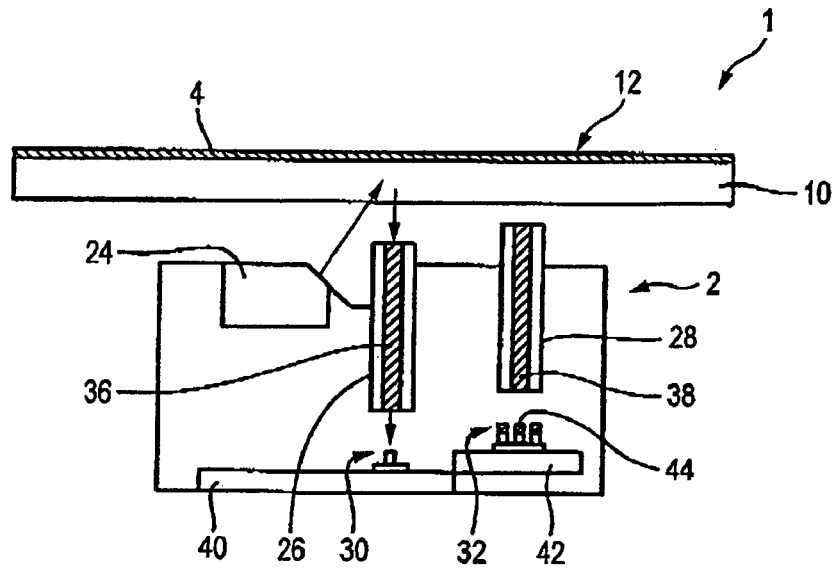
FIGS. 4A and 4B are schematic views showing the image reading device of the first embodiment of the invention.
Figure 4:
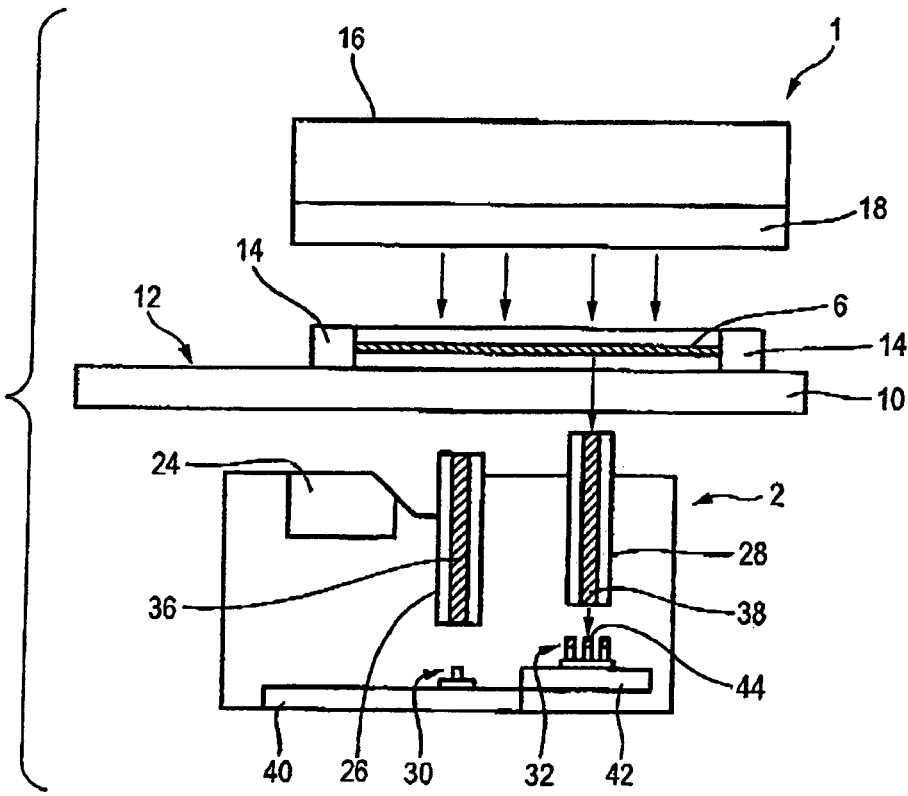

FIG. 2 to FIG. 4 are schematic diagrams showing an image scanner 1, which is an image reading device of a first embodiment of the present invention. Image scanner 1 is a so-called flatbed image scanner. Image scanner 1 can read reflection originals 4 (see FIG. 4A) and transmission originals of up to A4 size and A4 letter size. A reflection original 4, which is a first object, is a printed document or photograph, etc. A transmission original, which is a second object, is a 35 mm film (negative or positive film) 6 (see FIG. 4B), etc. In the description, that follows, 35 mm film 6 shall be used as the transmission original. The image reading device may be a sheet-feed type image scanner or a copier. The transmission original is not restricted to 35 mm film 6.

A housing 8 is formed to have a box shape with an open upper side and supports an original platen 10 on its open side. Original platen 10 is formed substantially of a rectangular glass plate or other transparent plate. On a platen surface 12 of original platen 12 is set reflection original 4 or 35 mm film 6, which is held by a holder 14 (see FIG. 4B). 35 mm film 6, which is fixed by holder 14, is held at a position separated by 1 mm in the upward direction from platen surface 12 of original platen 10.

As shown in FIG. 3, a transmission original light source 18 is positioned at the original platen 10 side of an original cover 16. Transmission original light source 18, which serves as a second light source unit, is equipped with a fluorescent tube lamp, reflector, diffuser plate, etc., which are not illustrated. The fluorescent lamp is positioned so that its longitudinal axial line extends in parallel to the longitudinal axial line of a guide rod 20. The reflector is disposed at the opposite side of original platen 10 with respect to the fluorescent lamp. The diffuser plate is disposed at the same side of original platen 10 as the fluorescent lamp. The light radiated from the fluorescent lamp is reflected by the reflector, diffused by the diffuser plate, and made to illuminate a reading region A1 (see FIG. 2) of 35 mm film 6 at uniform illuminance. The fluorescent lamp may be an LED (light emitting diode) instead.

A carriage 22 houses a contact image sensor module 2.

Figure 1:
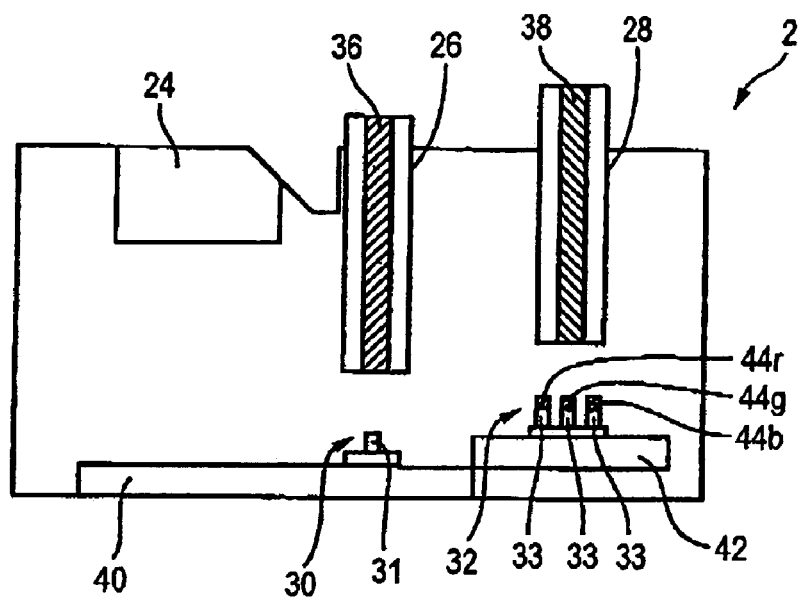
FIGS. 1A and 1B are schematic views of the first embodiment of the invention.
Figure 1:
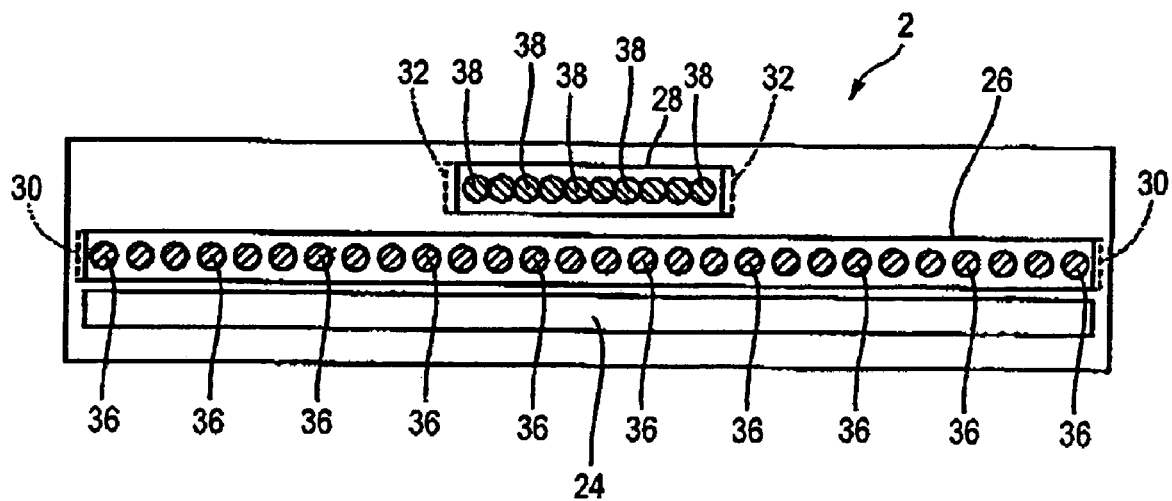

FIG. 1 is a schematic view showing contact image sensor module 2, mounted in image scanner 1.

Figure 8:
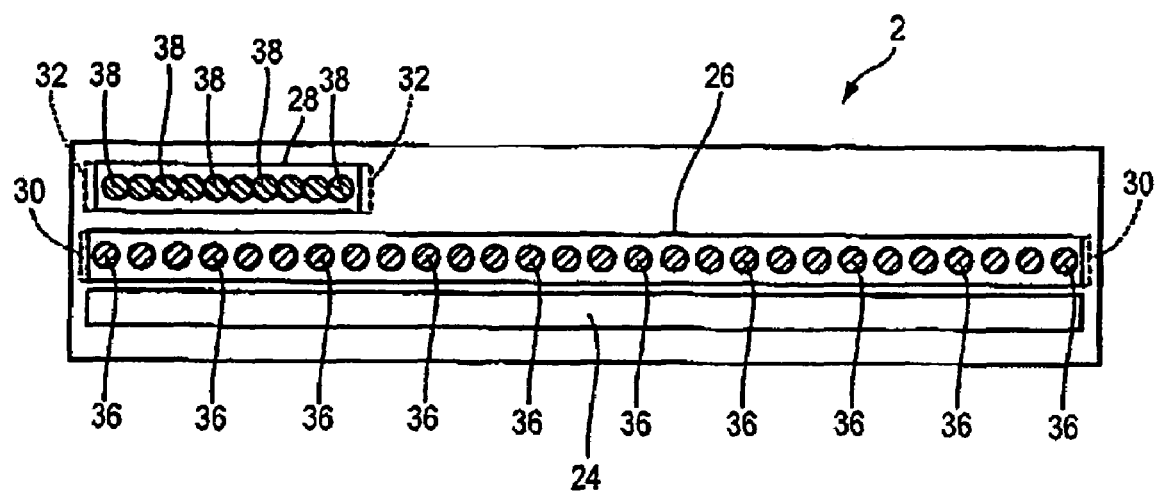
FIG. 8 is a schematic view of the first embodiment of the invention.

Contact image scanner module 2 is equipped with a reflection original light source 24, a first rod lens array 26, a second rod lens array 28, a first image sensor 30, a second image sensor 32, etc. As shown in FIG. 1B, these, components of contact image sensor module 2 are aligned and positioned with the center in their longitudinal direction as a reference. The longitudinal direction width of first image sensor 30 differs from the longitudinal direction width of second image sensor 32. Specifically, the longitudinal direction width of the alignment range of first light receiving elements 31, aligned in first image sensor 30, is 218 mm, which enables the reading of an original of A4 size and A4 letter size. The longitudinal direction width of the alignment range of second light receiving elements 33, aligned in second image sensor 32, is 27 mm, which enables the reading of a 35 mm film. First light receiving elements 31 and second light receiving elements 33 shall be described later. The longitudinal direction widths of reflection original light source 24 and first rod lens array 26 are designed with the longitudinal direction width of the alignment range of first light receiving elements 31.*as* a reference. The longitudinal direction width of second rod lens array 28 is designed based on the longitudinal direction width of the alignment range of second light receiving elements 33. The components of contact image sensor module 2 may be positioned in other ways. For example, as shown in FIG. 8, the components of contact image sensor module 2 may be aligned and positioned with one end face in their longitudinal direction as a reference. The longitudinal direction widths of first image sensor 30 and second image sensor 32 may be determined in accordance with the widths of originals and are not limited to 218 mm and 27 mm, respectively.

As shown in FIG. 4A, in the process of reading reflection original 4, reflection original light source 24, first rod lens array 26, and first image sensor 30 are used. As shown in FIG.

4B, in the process of reading 35 mm film 6, second rod lens array 28 and second image sensor 32 are used. The resolution of first image sensor 30 differs from the resolution of second image sensor 32. Specifically, the resolution of first image sensor 30 is 1200 dpi, which enables image information recorded on reflection original 4 to be reproduced adequately. The resolution of second image sensor 32 is 2400 dpi, which enables image information recorded on 35 mm film 6 to be reproduced adequately. The resolution of first image sensor 30 is not limited to 1200 dpi. The resolution of second image sensor 32 is not limited to 2400 dpi.

Reflection original light source 24, which functions as a first light source unit, is equipped with LED's which emit light of specific colors, and light guides. Specifically for example, reflection original light source 24 is equipped with an LED (red LED), which emits light of a red color, an LED (green LED), which emits light of a green color, and an LED (blue LED), which emits light of a blue color, for reading color images. The light emitted by each LED is guided by a light guide to the original platen 10 side and illuminates reflection original. 4. The unillustrated light guides are formed of glass or other light transmitting member. The first light source unit may be equipped with a fluorescent lamp instead.

First rod lens array 26, which functions as a first lens unit, has a, plurality of cylindrical lenses (rod lenses) 36 that are aligned linearly. From light radiated from reflection original light source 24 and reflected by reflection original 4, first rod lens array 26 forms an optical image, along a scan line, on light receiving surfaces of first light receiving elements 31, aligned in first image sensor 30, at unit magnification by means of first rod lenses 36.

First image sensor 30 is mounted on a printed circuit board 40. First image sensor 30 comprises the plurality of first light receiving elements 31, aligned linearly in a single column, a MOS transistor switch, etc. First image sensor 30 scans the optical image of reflection original 4 that has been formed by first rod lens array 26 and outputs electrical signals correlated to the density of the optical image. The optical image of reflection original 4 is thus converted into image signals.

The focal length of first rod lens array 26 and the interval between first rod lens array 26 and first image sensor 30 are designed so that the position (focal point position) of the original, the optical image of which is formed clearly on the light receiving surface of first image sensor 30 by first rod lens array 26, will be at platen surface 12 of original platen 10. Image scanner 1 can thus read reflection original 4, placed on platen surface 12 of original platen 10, clearly.

Second rod lens array 28, which functions as a second lens unit, is the same in arrangement as first rod lens array 26 and has second rod lenses 38. The focal length of second rod lens array 28 is equal to the focal length of first rod lens array 26. From light illuminated from transmission original light source 18 and transmitted through 35 mm film 6, second rod lens array 28 forms an optical image, along a scan line, on light receiving surfaces of second light receiving elements 33, aligned in second image sensor 32, at unit magnification.

Second image sensor 32 comprises the plurality of second light receiving elements 33, which are aligned in three columns in parallel to first light receiving elements 31 of first image sensor 30, a MOS transistor switch, etc., and is provided with color filters 44, which differ in color according to the rows of the light receiving elements. Specifically, color filters 44 are a filter (red filter) 44*r*, which transmits red light, a filter (green filter) 44*g*, which transmits green light, and a filter (blue filter) 44*b*, which transmits blue light. The white light radiated from transmission original light source 18 can thereby be color-separated into red light, green light, and blue light. By scanning the optical image of 35 mm film 6 that is formed by second rod lens array 28, second image sensor 32 outputs electrical signals correlated to the density of the optical image. The optical image of 35 mm film 6 is thus converted into image signals. Through color filters 44 were described as being provided in second image sensor 32 (that is, as being on-chip color filters), these may instead be parts that are separate from second image sensor 32.

Second rod lens array 28 is fixed onto carriage 22 at a position that is 1 mm closer to platen surface 12 of original platen 10 than first rod lens array 26. Second image sensor 32 is mounted to a printed circuit board 42, which is fixed to carriage 22 at a position that is just 1 mm closer to platen surface 12 of original platen 10 than printed circuit board 40. The light receiving surfaces of second light receiving elements 33 are thus just 1 mm closer to platen surface 12 of original platen 10 than the light receiving surfaces of first light receiving elements 31. Since second rod lens array 28 and the light receiving surfaces of second light receiving elements 33 are respectively positioned just 1 mm closer to platen surface 12 of original platen 10, the focal point position due to second rod lens array 28 and second image sensor 32 is positioned at a position that is separated in the upward direction by just 1 mm from platen surface 12 of original platen 10. Image scanner 1 can thus clearly read 35 mm film 6, which is held by holder 14 at a position that is separated from platen surface 12 of original platen 10 by just 1 mm in the upward direction. The height of second image sensor 32 may be designed to be just 1 mm higher than first image sensor 30 and first image sensor 30 and second image sensor 32 may be mounted on the same printed circuit board 40. The distance from platen surface 12 of original platen 10 to the focal point position may be determined in accordance with the position at which the original is held and is not limited to 1 mm.

Figure 5:
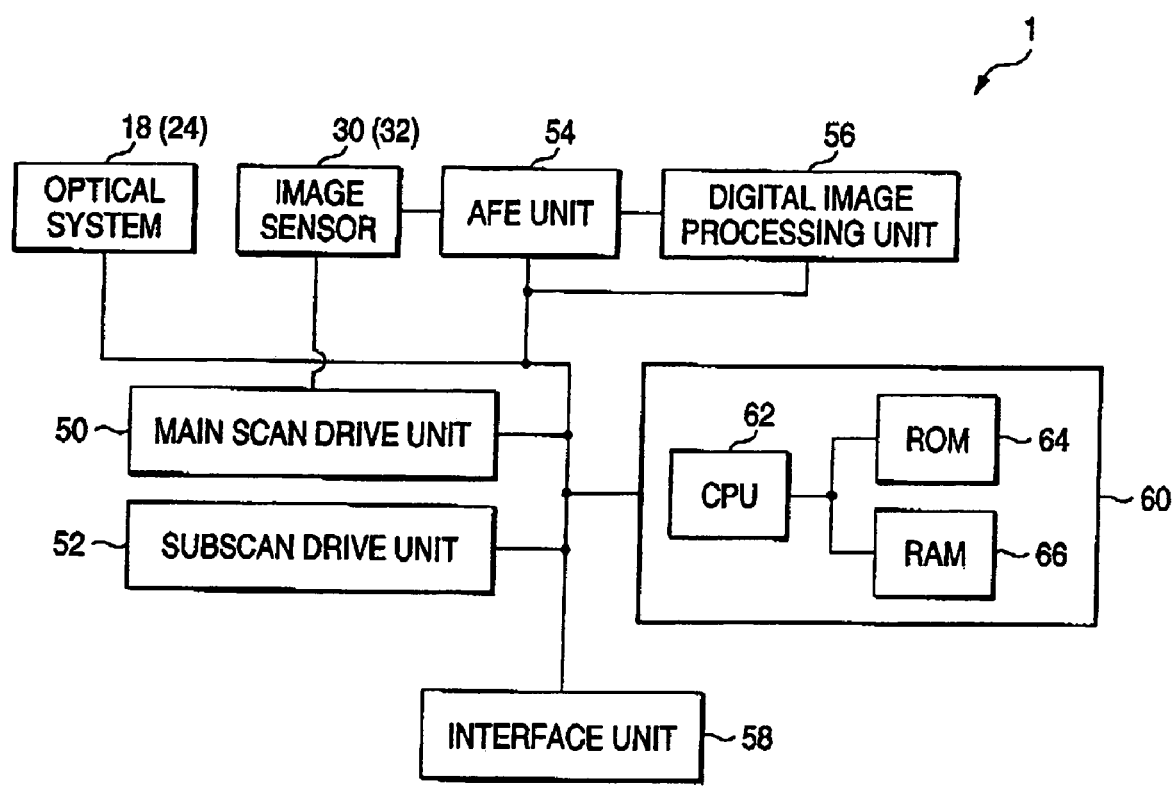
FIG. 5 is a block diagram of the image reading device of the first embodiment of the invention.

FIG. 5 is a block diagram showing the hardware arrangement of image scanner 1.

A main scan drive unit 50 is a drive circuit that outputs drive pulses necessary for driving first image sensor 30 and second image sensor 32 to first image sensor 30 and second image sensor 32. Main scan drive unit 50 comprises, for example, a synchronization signal generator, a drive timing generator, etc.

A sub scan drive unit 52 is equipped with guide rod 20, which slidably holds carriage 22, an unillustrated stepping motor, a drive belt 46, an unillustrated drive circuit, etc. By the stepping motor pulling carriage 22 by means of drive belt 46, first image sensor 30 and second image sensor 32 are moved relative to reflection original 4 or 35 mm film 6. Scanning of a two-dimensional image is thereby enabled.

An AFE (analog front end) unit 54 comprises an analog signal processing unit, an A/D converter, etc., which are unillustrated. The analog signal processing unit applies an amplification process, a noise reduction process, and other analog signal processes on the electrical signals output from first image sensor 30 and second image sensor 32 and outputs the processed signals. The A/D converter quantizes the electrical signals output from the analog signal processing unit to digitally expressed output signals of a predetermined bit length and outputs the digital signals.

A digital image processing unit 56 applies gamma correction, interpolation of missing pixels by pixel interpolation, shading correction, sharpening of image signals, color space conversion, and other image processes on the output signals output from AFE unit 54.

An interface unit 58 is arranged in compliance to a communication standard, such as RS-232C, Bluetooth, USB, etc.

Image scanner 1 can be communicably connected to an unillustrated personal computer (PC) by the interface unit 58.

A control unit 60 is equipped with a CPU 62, a ROM 64, and a RAM 66. CPU 62 executes a computer program stored in ROM 64 to control the respective parts of image scanner 1. ROM 64 is a memory storing various programs and data, and RAM 66 is a memory for temporarily storing various programs and data.

Figure 6:
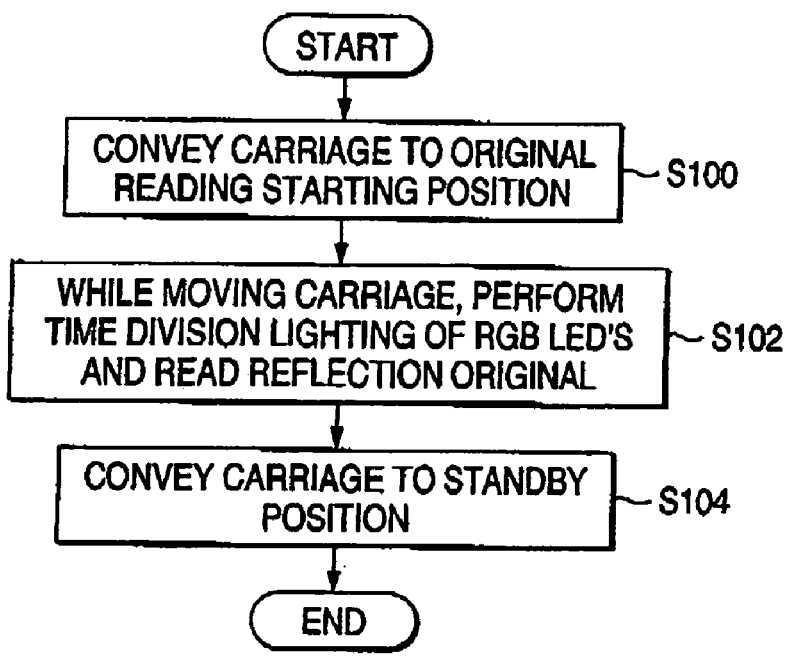
FIG. 6 is a flowchart of the first embodiment of the invention.

FIG. 6 is a flowchart of a process of reading reflection original 4. In the process of reading reflection original 4, image scanner 1 lights up the LED's of various colors of reflection original light source 24 in a time-divided manner during the reading of one line and reads color image data of one line of reflection original 4 in three readings. In the description that follows, image scanner 1 shall be deemed to be communicably connected to the PC.

A user sends a request to read reflection original 4 to image scanner 1 by operating the PC. Image scanner 1 receives the request to read reflection original 4 via interface unit 58. Upon receiving the request to read reflection original 4, control unit 60 controls subs scan drive unit 52 and conveys carriage 22 to a reading starting position for reflection original 4 (step S100).

In step S102, control unit 60 lights up the red LED, green LED, and blue LED of reflection original light source 24 in a time-divided manner while moving carriage 22 and reads the color image of reflection original 4.

Specifically for example, control unit 60 lights up the red LED, controls main scan drive unit 50 to convert the optical image of reflection original 4 in the scan range to electrical signals (red electrical signals) correlated to red components, and stores the digital data (red data) correlated to the red components output from AFE unit 54 into RAM 66. Control unit 60 then lights up the green LED, converts the optical image of reflection original 4 in the scan range to electrical signals (green electrical signals) correlated to green components, and stores the digital data (green data) correlated to the green components into RAM 66. Control unit 60 then lights up the blue LED, converts the optical image of reflection original 4 in the scan range to electrical signals (blue electrical signals) correlated to blue components, and stores the digital data (blue data) correlated to the blue components into RAM 66. When the red data, green data, and blue data, which have been read in a continuous manner at different positions, are stored in RAM 66, control unit 60 makes digital image processing unit 56 generate color image data for one line based on these digital data.

Until the color image data of all lines of reflection original 4 have been acquired, control unit 60 repeats the reading of one line while moving carriage 22 and thereby reads the color image of reflection original 4.

When the reading of reflection original 4 is ended, control unit 60 conveys carriage 22 to a standby position in step S104.

Figure 7:
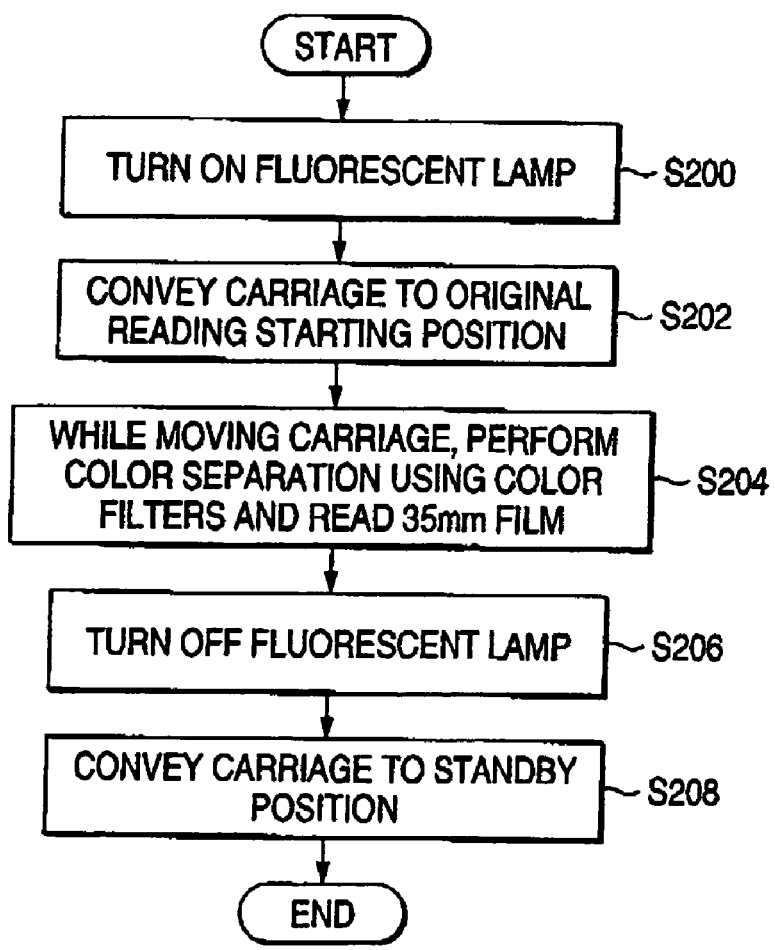
FIG. 7 is a flowchart of the first embodiment of the invention.

FIG. 7 is a flowchart of a process of reading 35 mm film 6. In the process of reading 35 mm film 6, second light receiving elements 33, which are aligned in three columns, are used to convert an optical image of 35 mm film 6 into electrical signals correlated to color components, which are in accordance with the colors of color filters 44 that are disposed at the respective columns. Specifically, for example, an optical image of 35 mm film 6 is converted into red electrical signals at the first column of second light receiving elements 33, into green electrical signals at the second column, and into blue electrical signals at the third column in a single reading. The color image data of three lines of 35 mm film 6 can thus be read in three readings (see FIG. 9).

A user sends a request to read 35 mm film 6 to image scanner 1 by operating the PC. Image scanner 1 receives the request to read 35 mm film 6 via interface unit 58. Upon receiving the request to read 35 mm film 6, control unit 60 turns on the fluorescent lamp of transmission original light source 18 (step S200).

In step S202, control unit 60 conveys carriage 22 to a reading starting position for 35 mm film 6.

Figure 9:
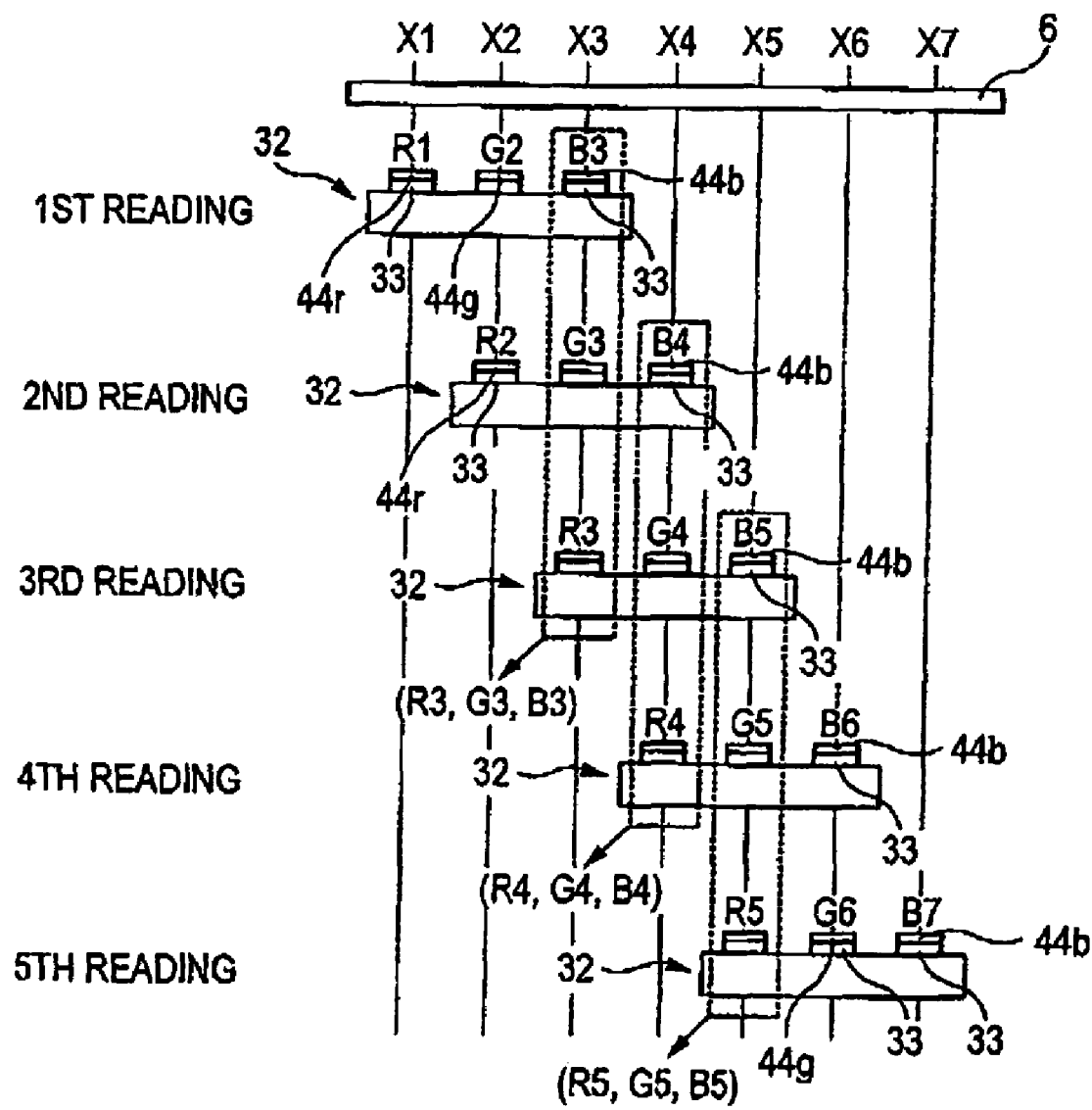
FIG. 9 is a schematic view of the first embodiment of the invention.

In step S204, control unit 60, while moving carriage 22, converts the optical image of the scan range of 35 mm film 6, which has been color-separated by color filters 44, into electrical signals correlated to the respective color components and thereby reads a color image of 35 mm film 6. FIG. 9 is a schematic diagram showing a specific example of the operation of reading the color image of 35 mm film 6. FIG. 9 illustrates five reading operations that are carried out from a certain point in time. With this example, a description shall be provided for the case where reading is repeated at the timing at which carriage 22 moves by just the width between columns of second light receiving elements 33 of second image sensor 32, which are positioned in three columns. Positions X1 to X7 indicate positions of reading by second light receiving elements 33. Red electrical signals R1 to R5 indicate red electrical signals resulting from conversion at positions X1 to X5, respectively, green electrical signals G2 to G6 indicate green electrical signals resulting from conversion at positions X2 to X6, respectively, and blue electrical signals B3 to B7 indicate blue electrical signals resulting from conversion at positions X3 to X7, respectively.

Second image sensor 32 outputs a red electrical signal, a green electrical signal, and a blue electrical signal of different positions in a single reading. For example, in the first reading, red electrical signal R1 of position X1, green electrical signal G2 of position X2, and blue electrical signal B3 of position X3 are output at the same time. The electrical signals of the respective color components that are output from second image sensor 32 are converted to digital data by AFE unit 54 and then stored in RAM 66. When the red data, green data, and blue data of a certain reading position have been stored in RAM 66, control unit 60 makes digital image processing unit 56 generate the color image data for one line based on these digital data. For example, when the third reading is ended, control unit 60 makes the color image data ((R3, G3, B3)) for one line be generated based on the red data, green data, and blue data correlated to the electrical signals (R3, G3, B3) of position X3 that are stored in RAM 66. Control unit 60 likewise makes the color image data ((R4, G4, B4)) for one line at position X4 be generated when the fourth reading is ended and makes the color image data ((R5, G5, B5)) for one line at position X5 be generated when the fifth reading is ended. The color image data for three lines can thus be read in three readings.

Control unit 60 repeats the reading of one line while moving carriage 22 until the color image data for all lines are acquired and thereby reads the color image of 35 mm film 6.

When the reading of the color image of the 35 mm film is completed, control unit 60 turns off the fluorescent lamp of transmission original light source 18 (step S206) and conveys carriage 22 to the stand by position (step S208).

With the above-described contact image sensor module 2 according to the first embodiment of the present invention, since the focal point position due to first image sensor 30 and first rod lens array 26 is fixed at platen surface 12 of original platen 10 and the focal point position due to second image sensor 32 and second rod lens array 28 is fixed at a position 1 mm separated from platen surface 12 of original platen 10, both a reflection original 4, placed on platen surface 12 of original platen 10, and a 35 mm film 6, held by holder 14, can be read clearly.

Furthermore, since the focal length of first rod lens array 26 and the focal length of second rod lens array 28 are equal, the same lenses can be used as first rod lenses 36 and second rod lenses 38. Since lenses in common can thus be used in first rod lens array 26 and second rod lens array 28, the manufacturing cost can be reduced.

Furthermore with the above-described contact image sensor module 2 according to the first embodiment of the present invention, since first image sensor 30, with a resolution of 1200 dpi, and a second image sensor 32 of 2400 dpi are equipped, reflection original 4 of low image information recording density can be read with first image sensor 30 and 35 mm film 6 of high image information recording density can be read with second image sensor 32. By reading reflection original 4, which can be adequately reproduced by reading at 1200 dpi, not by second image sensor 32 of 2400 dpi but by first image sensor 30 of 1200 dpi, the generation of noise, which tends to increase as the resolution of an image sensor increases, can be reduced. The image quality of the read image of reflection original 4 can thus be improved.

Furthermore, by setting the longitudinal direction width of second image sensor 32 of 2400 dpi not to a width enabling reading of A4 size or A4 letter size but to 27 mm in accordance with 35 mm film 6, the manufacturing cost of second image sensor 32 can be reduced. The manufacturing cost of contact image sensor module 2 can thus be reduced.

Furthermore, by reading 35 mm color film 6 by second image sensor 32, which reads an image upon performing color separation of the white light radiated by transmission original light source 18 by means of color filters 44, the reading time can be shortened in comparison to the case where an image is read by light radiated in a time-divided manner.

With the above-described image scanner 1 according to the present invention's embodiment, since first image sensor 30, with a resolution of 1200 dpi, and a second image sensor 32 of 2400 dpi are equipped, reflection original 4 of low image information recording density can be read with first image sensor 30 and 35 mm film 6 of high image information recording density can be read with second image sensor 32. By reading reflection original 4, which can be adequately reproduced by reading at 1200 dpi, not by second image sensor 32 of 2400 dpi but by first image sensor 30 of 1200 dpi, the generation of noise, which tends to increase as the resolution of an image sensor increases, can be reduced. The image quality of the read image of reflection original 4 can thus be improved.

Furthermore, by reading 35 mm film 6 by second image sensor 32, which reads an image upon performing color separation of the white light radiated by transmission original light source 18 by means of color filters 44, the reading time can be shortened in comparison to the case where an image is read by light radiated in a time-divided manner.

Furthermore, by setting the longitudinal direction width of second image sensor 32 of 2400 dpi not to a width enabling reading of A4 size or A4 letter size but to 27 mm in accordance with 35 mm film 6, the manufacturing cost of second image sensor 32 can be reduced. The manufacturing cost of image scanner 1 can thus be reduced.

For contact image sensor module 2, a second reflection original light source, which radiates light to be reflected by reflection original 4 and made incident on the light receiving surfaces of second image sensor 32, may be provided. Reflection original 4 in the range of reading region A1 of 35 mm film 6 can thereby be read at high resolution.

Second Embodiment

Figure 10:
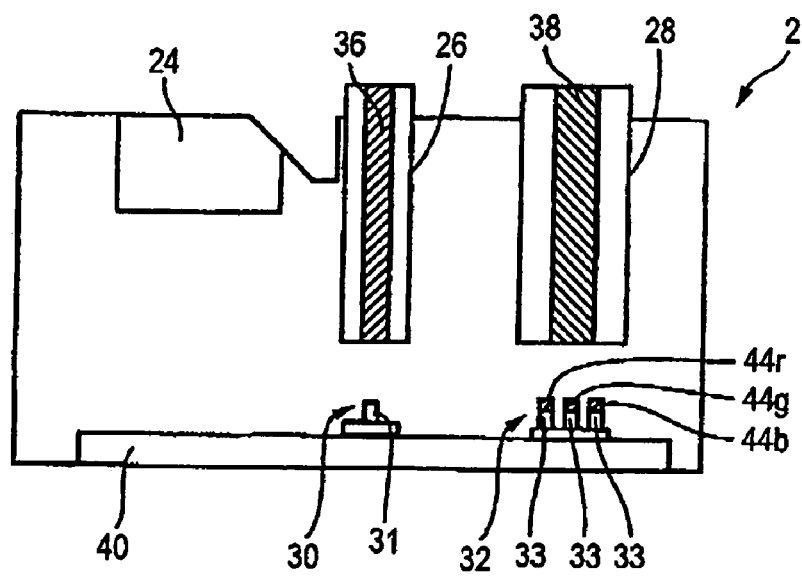
FIGS. 10A and 10B are schematic views of the second embodiment of the invention.
Figure 10:
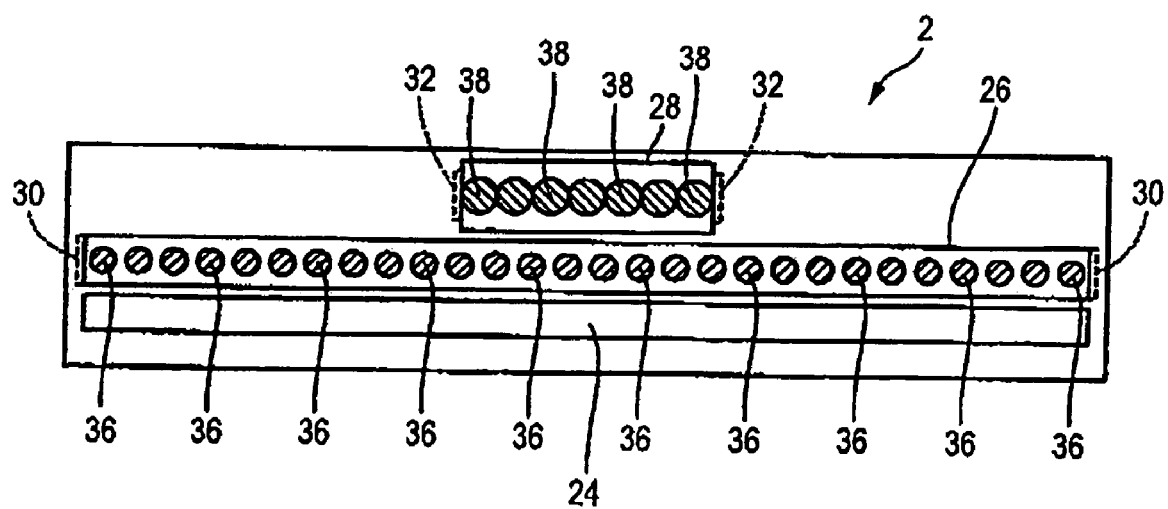

With a contact image sensor module 2 according to the second embodiment of the present invention, a first image sensor 30 and a second image sensor 32 are mounted on the same printed circuit board 40 (see FIG. 10). For the second embodiment, parts that are practically the same as those of the first embodiment shall be provided with the same symbols and description thereof shall be omitted.

The focal length of a first rod lens array 26 differs from the focal length of a second rod lens array 28. First image sensor 30 and second image sensor 32 are mounted on the same printed circuit board 40. The focal length of first rod lens array 26 is designed so that the focal point position due to first image sensor 30 and first rod lens array 26 will be at platen surface 12 of original platen 10. The focal length of second rod lens array 28 is designed so that the focal point position due to second image sensor 32 and second rod lens array 28 will be at a position 1 mm away from platen surface 12 of original platen 10.

With the above-described contact image sensor module 2 according to the second embodiment of the present invention, first image sensor 30 and second image sensor 32 can be mounted on the same printed circuit board 40. The arrangement of contact image sensor module 2 can thus be simplified. It becomes possible to integrate first image sensor 30 and second image sensor 32 on a single chip.

For contact image sensor module 2, a second reflection original light source, which radiates light to be reflected by reflection original 4 and made incident on the light receiving surfaces of second image sensor 32, may be provided. Reflection original 4 in the range of reading region A1 of 35 mm film 6 can thereby be read at high resolution.

What is claimed is:

1. A contact image sensor module comprising:
    a first image sensor that includes a first light receiving element set aligned in a straight line;
    a second image sensor that includes a second light receiving element set aligned in parallel to the first light receiving element set;
    a first lens unit that forms, on the first light receiving element set, a clear image of a first object positioned at a first distance from a light receiving surface of the first light receiving element set; and
    a second lens unit that forms, on the second light receiving element set, a clear image of a second object positioned at a second distance, differing from the first distance, from the light receiving surface of the first light receiving element set,
    wherein a focal length of the first lens unit is equal to a focal length of the second lens unit.

2. The contact image sensor module according to claim 1, wherein the resolution of the first image sensor differs from the resolution of the second image sensor.

3. The contact image sensor module according to claim 2, wherein a longitudinal direction width of an alignment range of the first light receiving element set differs from a longitudinal direction width of an alignment range of the second light receiving element set.

4. An image reading device comprising the contact image sensor module according to any of claims 1, 2, and 3.

5. The image reading device according to claim 4, further comprising:

an original platen on which the first object and the second object are to be set;

a first light source unit that radiates light of a plurality of colors in a time-divided manner to illuminate the first object; and a second light source unit that radiates white light to illuminate the second object; and wherein the first image sensor includes the first light receiving element set arranged in one channel, wherein the second image sensor includes the second light receiving element set arranged in three channels, and wherein the contact image sensor module includes color filters that perform color separation of the white light illuminated from the second light source unit and make the color-separated light incident on the respective channels of the second light receiving element set.

6. An image reading device comprising:

a first light source unit that radiates light of a plurality of colors in a time-divided manner to illuminate a first object;

a second light source unit that radiates white light to illuminate a second object; and a contact image sensor module including a first image sensor that includes a first light receiving element set arranged in one channel and aligned in a straight line, a second image sensor that includes a second light receiving element set that is arranged in three channels, aligned in parallel to the first light receiving element set, and differs in resolution from the first image sensor, a first lens unit that forms an image of the first object on the first light receiving element set, a second lens unit that forms an image of the second object on the second light receiving element set, and color filters that performs color separation of the white light illuminated from the second light source unit and make the color-separated light incident on the respective channels of the second light receiving element set.

7. The image reading device according to claim 6, wherein the longitudinal direction width of the alignment range of the first light receiving element set differs from the longitudinal direction width of the alignment range of the second light receiving element set.

* * * * *